(12) United States Patent
Schumacher et al.

(10) Patent No.: US 8,827,684 B1
(45) Date of Patent: Sep. 9, 2014

(54) 3D PRINTER AND PRINTHEAD UNIT WITH MULTIPLE FILAMENTS

(71) Applicants: Nathan D. Schumacher, Madison, WI (US); Nathan J. Patterson, Fitchburg, WI (US); Kevin L. Harris, Lawton, OK (US); Todd J. Bakken, Madison, WI (US)

(72) Inventors: Nathan D. Schumacher, Madison, WI (US); Nathan J. Patterson, Fitchburg, WI (US); Kevin L. Harris, Lawton, OK (US); Todd J. Bakken, Madison, WI (US)

(73) Assignee: Radiant Fabrication, Fitchurg, WI (US)

( * ) Notice: Subject to any disclaimer, the term of this patent is extended or adjusted under 35 U.S.C. 154(b) by 0 days.

(21) Appl. No.: 14/139,349

(22) Filed: Dec. 23, 2013

(51) Int. Cl.
 *B28B 1/16* (2006.01)
(52) U.S. Cl.
 USPC ............. 425/375; 264/308; 425/192 R
(58) Field of Classification Search
 USPC .............. 425/131.1, 190, 131.5, 182, 192 R, 425/376.1; 264/40.1, 28, 308, 211.21, 401, 264/113; 226/181, 188
 See application file for complete search history.

(56) References Cited

U.S. PATENT DOCUMENTS

| | | |
|---|---|---|
| 1,574,726 A | 2/1926 | Bullard, Jr. |
| 1,671,354 A | 5/1928 | DeLeeuw |
| 1,743,862 A | 1/1930 | Morris |
| 2,393,696 A | 1/1946 | Kraut et al. |
| 2,404,146 A | 7/1946 | Scarff |
| 2,540,186 A | 2/1951 | Bullard et al. |
| 2,965,208 A | 12/1960 | Forster et al. |
| 3,498,772 A * | 3/1970 | Stalego .................... 65/526 |
| 3,792,633 A | 2/1974 | Filipiev et al. |
| 4,156,383 A | 5/1979 | Maddox |
| 4,267,893 A | 5/1981 | Mannon, Jr. |
| 4,341,502 A | 7/1982 | Makino |
| 4,568,238 A | 2/1986 | Hirano et al. |
| 4,575,330 A | 3/1986 | Hull |
| 4,589,174 A | 5/1986 | Allen |
| 4,594,670 A | 6/1986 | Itoh |
| 4,648,785 A | 3/1987 | Nakagawa et al. |

(Continued)

FOREIGN PATENT DOCUMENTS

| | | |
|---|---|---|
| EP | 1262305 B1 | 6/2006 |
| EP | 2003954 A2 | 12/2008 |
| WO | 2009017739 A1 | 2/2009 |

OTHER PUBLICATIONS

RepRapWiki "RepOlaRap", Wikipedia, last modified on Jan. 29, 2011, website. Date of Access: Jan. 10, 2013. <http://reprap.org/wiki/RepOlaRap>.
BeagleFury, RepRap: Builders "Meet Ola, the RepolaRap (At least, her first parts)" posted Jan. 12, 2010, website. Date of Access: Jan. 10, 2013. <http://builders.reprap.org/2010/01/meet-ola-repolarap-at-least-her-first.html>.

(Continued)

*Primary Examiner* — Dimple Bodawala
*Assistant Examiner* — Emmanuel S Luk
(74) *Attorney, Agent, or Firm* — Stiennon & Stiennon

(57) ABSTRACT

A fused filament fabrication printer has a fixed extrusion module having multiple printheads having print tips. The fixed arrangement of the printing heads allows the close spacing of multiple print tips in a printhead unit, and the simple routing of multiple plastic or metal filaments to the individual printing heads. The closely spaced print tips in the printhead unit share common components. An exemplary printhead unit has four printing heads which share a common heating block and heating block temperature sensor. The heating block incorporates a group of four print tips evenly spaced along a line. Each printing head has a separate filament which is controlled and driven by its own stepper motor through the heating block to one of the print tips. Printing of a part is by control of individual stepper motors which drive filaments through the heating block and through one of the printing tips.

22 Claims, 4 Drawing Sheets

(56) References Cited

U.S. PATENT DOCUMENTS

| | | | |
|---|---|---|---|
| 4,787,813 A | | 11/1988 | Stevens et al. |
| 5,121,329 A | | 6/1992 | Crump |
| 5,503,785 A | * | 4/1996 | Crump et al. ............. 264/40.7 |
| 5,633,021 A | * | 5/1997 | Brown et al. ............. 425/375 |
| 5,697,270 A | | 12/1997 | Link |
| 5,905,514 A | * | 5/1999 | Rhoads et al. ............. 347/33 |
| 5,944,893 A | * | 8/1999 | Anderson ............. 118/300 |
| 5,968,561 A | * | 10/1999 | Batchelder et al. ............. 425/375 |
| 5,969,731 A | * | 10/1999 | Michael et al. ............. 347/33 |
| 6,022,207 A | * | 2/2000 | Dahlin et al. ............. 425/145 |
| 6,090,445 A | * | 7/2000 | Anderson ............. 427/256 |
| 6,165,406 A | * | 12/2000 | Jang et al. ............. 264/308 |
| 6,212,968 B1 | | 4/2001 | Hiruma et al. |
| 6,508,971 B2 | | 1/2003 | Leyden et al. |
| 6,532,394 B1 | | 3/2003 | Earl et al. |
| 6,813,822 B2 | | 11/2004 | Baldini et al. |
| 7,077,638 B2 | | 7/2006 | Leyden et al. |
| 7,591,536 B2 | | 9/2009 | Silverbrook |
| 7,604,470 B2 | * | 10/2009 | LaBossiere et al. ....... 425/131.1 |
| 7,625,200 B2 | * | 12/2009 | Leavitt ............. 425/375 |
| 7,726,761 B2 | | 6/2010 | Ishida |
| 7,833,001 B2 | | 11/2010 | Silverbrook |
| 8,033,811 B2 | | 10/2011 | Swanson et al. |
| 8,222,908 B2 | | 7/2012 | Paul et al. |
| 8,226,395 B2 | * | 7/2012 | Pax et al. ............. 425/174.4 |
| 8,404,171 B2 | | 3/2013 | Heenan |
| 8,512,024 B2 | * | 8/2013 | Pax ............. 425/131.1 |
| 2004/0126452 A1 | * | 7/2004 | Swanson et al. ............. 425/73 |
| 2005/0280185 A1 | | 12/2005 | Russell et al. |
| 2007/0090568 A1 | * | 4/2007 | Teal et al. ............. 264/308 |
| 2007/0228590 A1 | | 10/2007 | LaBossiere et al. |
| 2009/0035405 A1 | * | 2/2009 | Leavitt ............. 425/97 |
| 2010/0096072 A1 | * | 4/2010 | Hopkins et al. ............. 156/155 |
| 2012/0018924 A1 | | 1/2012 | Swanson et al. |
| 2012/0068378 A1 | * | 3/2012 | Swanson et al. ............. 264/308 |
| 2012/0164256 A1 | * | 6/2012 | Swanson et al. ............. 425/162 |
| 2012/0189729 A1 | * | 7/2012 | Pax ............. 425/378.1 |
| 2012/0237631 A1 | | 9/2012 | Jenko |
| 2012/0267813 A1 | * | 10/2012 | Perret et al. ............. 264/40.5 |
| 2012/0286453 A1 | * | 11/2012 | Pettis ............. 264/401 |
| 2012/0287459 A1 | * | 11/2012 | Pettis ............. 358/1.14 |

OTHER PUBLICATIONS

BeagleFury "New direction on RepolaRap firmware" posted Feb. 1, 2010, website. Date of Access: Jan. 10, 2013. <http://forums.reprap.org/read.php?147,34720,34784,quote=1>.

Microcontroller Forum Tracker "Giving Sight to 'Ola'", website. Date of Access: Jan. 10, 2013. <http://www.microcodes.info/giving-sight-to-ola-119541.html>.

Cb4, adafruit support "rather awesome positioning system (R.A.P.S.)" Adafruit Industries, posted on Jun. 11, 2010 and Jun. 12, 2010, website. Date of access: Jan. 10, 2013. <http://www.adafruit.com/forums/viewtopic.php?f=31&p=80257>.

BeagleFury, RepRap: Builders "RepolaRap Calibration thoughts" posted on Jan. 14, 2010, website. Date of Access: Jan. 10, 2013. <http://builders.reprap.org/2010/01/repolarap-calibration-thoughts.html>.

BeagleFury, RepRap:Builders "RepolaRap Motor Mounted" posted on Jan. 17, 2010, website. Date of Access: Jan. 10, 2013. <http://builders.reprap.org/2010/01/repolarap-motor-mounted.html>.

BeagleFury, "RepolaRap Two Motor Test.mpg", uploaded Jan. 31, 2010, YouTube video. Date of Access: Jan. 24, 2013. <http://www.youtube.com/watch?v=UYO6RD787fM>.

BeagleFury, "RepolaRap_BuildPlatformMotor.mpg", uploaded Jan. 23, 2010, YouTube video. Date of Access: Jan. 24, 2013. <http://www.youtube.com/watch?v=uv8xSAuwKdY>.

Wolfgang Boehler, Andreas Marbs, "3D Scanning Instruments", i3mainz, Institute for Spatial Information and Surveying Technology, FH Mainz, University of Applied Sciences, Mainz, Germany. <i3mainz@geoinform.fh-mainz.de>.

Fausto Bernardini, Holly Rushmeier, "The 3D Model Acquisition Pipeline", Computer Graphics Forum, vol. 21, (2002), No. 2, pp. 149-172.

U.S. Patent Application Titled "Three-Dimensional Printing System Using Dual Rotation Axes", Unpublished (filing date Jan. 20, 2012) (Mackie et al., applicants).

"All Metal" 1.75 Filament Rostock Delta Dual Extruder, Bowden, Reprap, 3D, found at <http://www.ebay.com/itm/ALL-METAL-1-75-FILAMENT-ROSTOCK-DELTA-DUAL-EXTRUDER-BOWDEN-REPRAP-3D-/181271173914>, accessed on Dec. 9, 2013.

* cited by examiner

3D PRINTER AND PRINTHEAD UNIT WITH MULTIPLE FILAMENTS

CROSS REFERENCES TO RELATED APPLICATIONS

The present application is a continuation-in-part of U.S. application Ser. No. 13/750,731 filed on Jan. 25, 2013 which is incorporated herein by reference.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to extrusion-based 3-D printers, termed fused deposition modeling or fused filament fabrication printers, in general and more particularly to printers using a printhead which applies layers of thermoplastic (e.g. ABS, HDPE, PLA, PVA) a metal or metal containing carrier, or polymers and composites that are doped with a variety of secondary materials such as wood and carbon nano-tubes to create models, prototypes, patterns, and production parts.

Fused filament fabrication works on an "additive" principle by laying down material in layers. This technique was initially developed by S. Scott Crump in 1989 and is described in U.S. Pat. No. 5,121,329. Initially such printers were extremely expensive, purchasable only by large companies, or accessible by outsourcing a 3-D model file to a fused filament fabrication printer or a competing technology, such as stereolithography as described in U.S. Pat. No. 4,575,330. Recent interest in fused filament fabrication has been increased by the development of consumer models of such printers of much lower cost. The development of low cost alternatives has been fueled by the expiration of U.S. Pat. No. 5,121,329 and the decreasing cost of high precision and reliable motors, motor controllers, and other key components required by fused filament fabrication printers.

A US patent application entitled Three-Dimensional Printing System Using Dual Rotating Axes, to Thomas Mackey, Nathan Patterson, Benjamin Cox, Nathan Schumacher, and George Petry, filed in 2012 (Mackey et al.) shows a rotating build platform and rotary mounted printheads.

Fused filament fabrication, i.e. three-dimensional printing, in addition to providing three-dimensional models or parts for conceptual design studies also allows the manufacturing of functional items or tooling. Patterns for various metal and plastic casting technologies can also be formed. Typically, a plastic filament or metal wire is unwound from a coil and supplies material to an extrusion nozzle that can start and stop material flow. The nozzle is heated to melt the material and can be moved in both horizontal and vertical directions by a numerically controlled mechanism which is often directly controlled by a computer-aided manufacturing (CAM) software package. The model or part is produced by extruding small amounts of thermoplastic or other material to form layers as the material hardens immediately after extrusion from the nozzle. Tools for thermoforming and injection molding can be made, as well as fixtures which assist the manufacturing operation. In addition to providing for very low run manufacturing operations, art objects and display objects can be readily manufactured. Improvements of fused filament fabrication printers requires an increase in printing speed, printing with multiple materials, and lower printer costs.

SUMMARY OF THE INVENTION

The fused filament fabrication printer of this invention employs an arrangement where the printing head(s) are fixed during printing and the build platform on which parts are made is moved in three dimensions or directions. This arrangement allows optimization of the printheads for greater speed and less cost. In the co-pending U.S. patent application Ser. No. 13/750,731, filed on Jan. 25, 2013, the build platform is formed of a circular disk mounted for rotation about a z-axis, and mounted for linear motion along a radial y-axis direction perpendicular to the z-axis, and for linear motion along the z-axis between successive print planes. But any arrangement where the printheads are fixed and only the build platform moves can be used. Because the printing heads are fixed, multiple printing heads can be affixed with respect to the build platform without causing interference of the printheads with each other and without increasing the complexity of controlling movements of multiple printheads. The fixed arrangement of the printing heads allows the close spacing of multiple printheads in a printhead unit and the simple routing of multiple plastic filaments to the individual printheads. The closely spaced printheads in the printhead unit allow the printheads to share common components. An exemplary printhead unit has four printheads which share a common heating block and heating block temperature sensor(s). The heating block incorporates a group of four print tips evenly spaced along a line. Each printhead has a separate plastic filament which is controlled and driven by its own stepper motor through the heating block to one of the print tip. The spacing of the drives which supply the multiple plastic filaments is independent of the nozzle spacing. This allows much closer together nozzles while maintaining consistent flow paths for the filament. Printing of a plastic part is effected by control of the individual stepper motors which drive each of the plastic filaments through the heating block and through one of the printing tips. Printing heads using the same material enable material deposition to be increased resulting in increased printing speed, while heads using different materials provides increased printing speed and permit the simultaneous deposition of different materials, e.g., different colors, onto the part on the build platform. When multiple colors are used all colors can be used to fill the interior of the part, while particular colors are used to color the exterior surface of the part.

In an alternative embodiment, a printhead unit incorporating an array of printheads can be used to replace a conventional printhead in a fused filament fabrication printer with a moving printhead.

It is an object of the present invention to provide a fused filament fabrication printer of reduced cost and increased speed.

It is another object of the present invention to provide a fused filament fabrication printer which facilitates the use of multiple printheads which are simultaneously active.

It is another object of the present invention to provide a fused filament fabrication printer which facilitates the use of multiple printheads to apply different materials.

It is a further object of the present invention to provide a fused filament fabrication printer with the printhead unit incorporating an array of printheads to create the printed part.

Further objects, features and advantages of the invention will be apparent from the following detailed description when taken in conjunction with the accompanying drawings.

DESCRIPTION OF THE PREFERRED EMBODIMENTS

Figure 1:
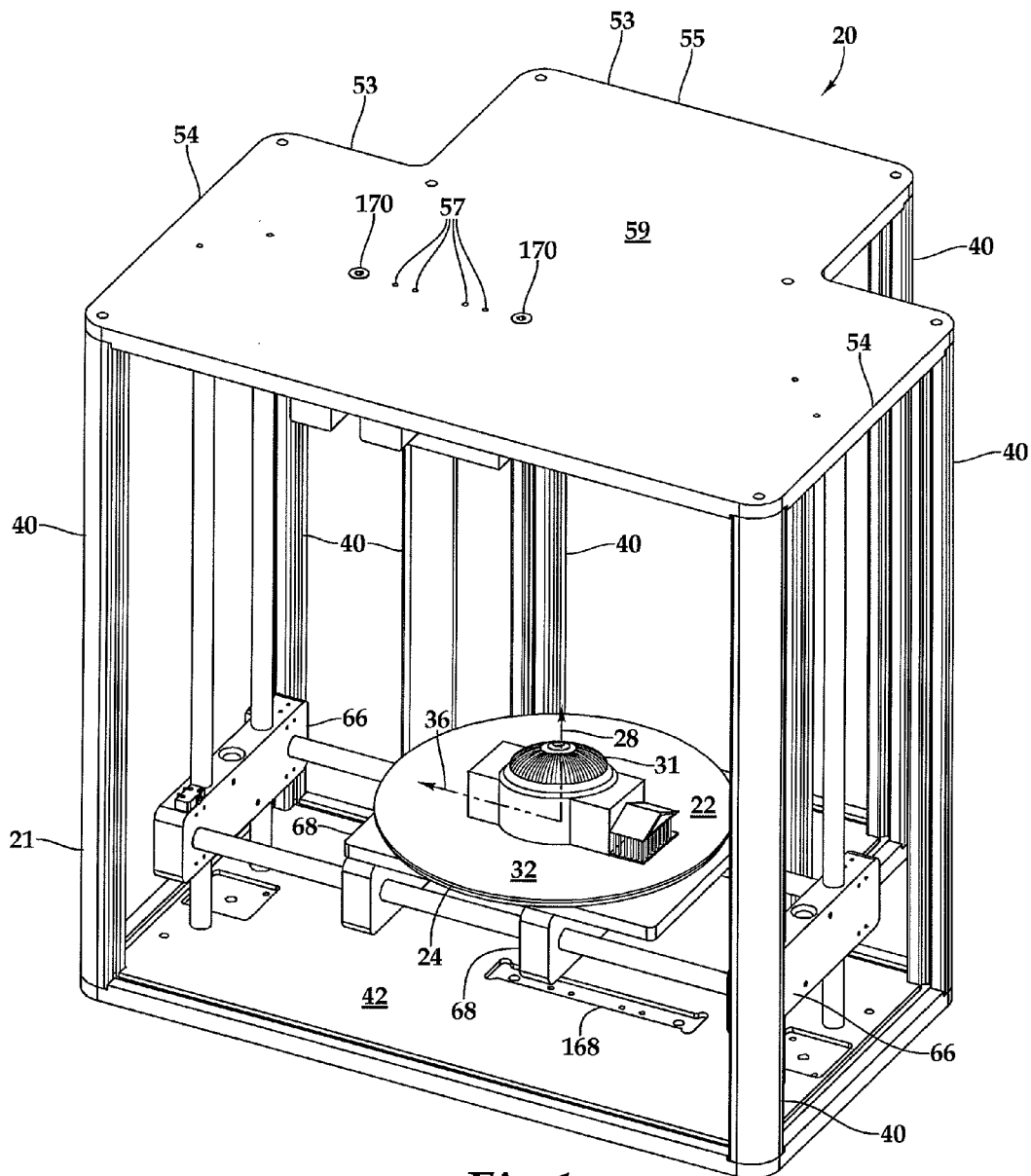
FIG. 1 is a front axonometric view of the fused filament fabrication printer of this invention.
Figure 2:
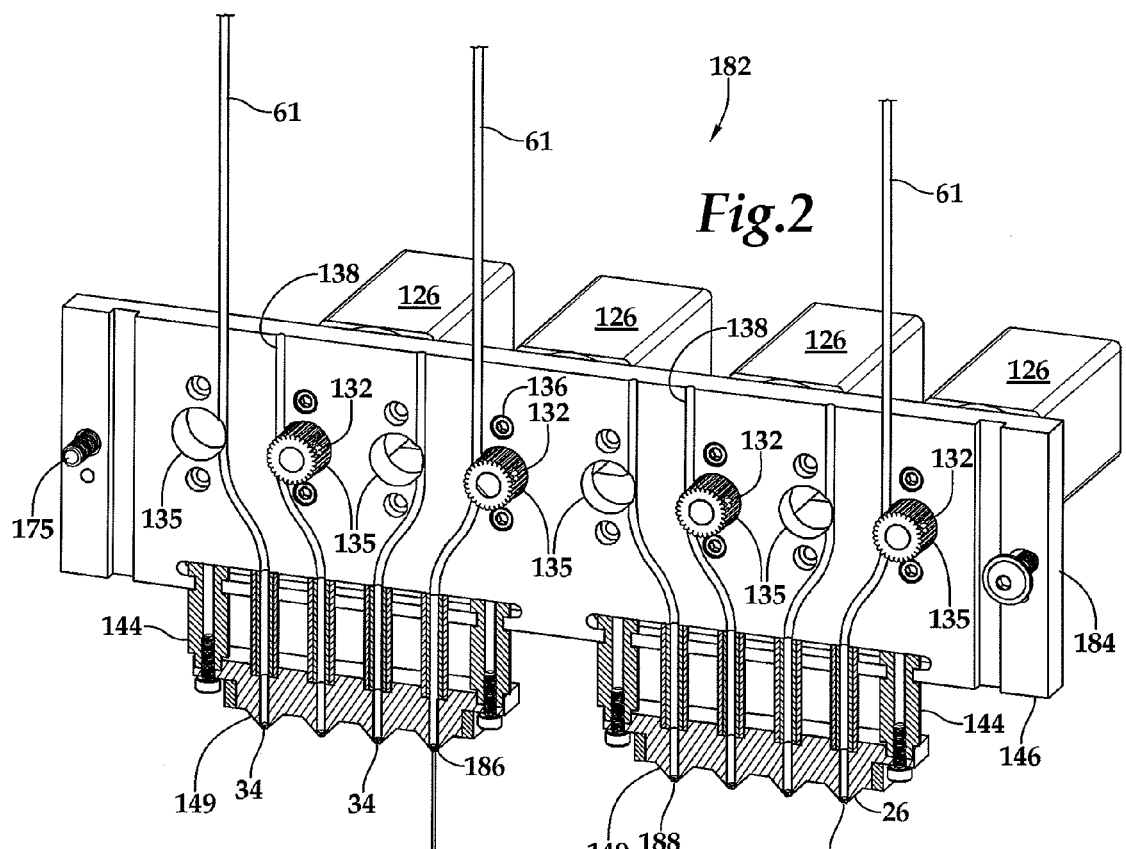
FIG. 2 is a fragmentary front axonometric view of two printhead units each having four printheads.

Referring more particularly to exemplar FIGS. 1-6, wherein like numbers refer to similar parts, a fused filament fabrication stereo lithographic printer 20 is shown in FIG. 1. The printer 20 has a frame 21 which for clarity is shown without lead screws and drive motors (such as shown in U.S. application Ser. No. 13/750,731). The printer 20 provides movement of a printer build platform 24 along three degrees of freedom to position various portions 22 of the printer build platform beneath a plurality of fixed printheads 26 as shown in FIG. 2. The printheads 26 have tips 34 through which thermoplastic polymers or metals are extruded. The three degrees of freedom include a first degree of freedom of rotation of the build platform 24 about a z-axis 28 as shown in FIG. 1. The build platform 24 defines a start-print plane or surface 32. A second degree of freedom is provided by linear motion on a cross slide along a radius along a y-axis 36 perpendicular to a z-axis 28. A third degree of freedom is provided by linear motion of the printer platform in a Z-direction along the z-axis 28 on the vertical carriage 66. The build platform 24 is moved in the Z-direction so the surface 32 occupies a series of stacked parallel planes, each parallel to a plane defined by the tips 34 of the printheads 26. The printed part or model 31 is generated by the indexing of the build platform 24 in the horizontal direction along the y-axis 36, indexing the build platform in the Z direction 28, and rotating the build platform either continuously or by a series of steps while controlling the turning on and off of the extrusion process in the printheads.

As shown in FIG. 1, the printer 20 has a T-shaped base plate 42 and an mirror image upper T-shaped plate 54 which is spaced from the base plate by six vertical supports 40. The printer 20 is mechanically similar to the one disclosed in U.S. application Ser. No. 13/750,731, where machine screws (not shown) and stepper motors (not shown) drive the vertical movement of the vertical carriage 66, the cross slide 68, and the rotation of the build platform 24. The T-shaped base plate 42 has an extension 53 which provides for mounting a computer and power supply (not shown) above which are mounted scanning cameras (not shown). The mirror image extension 53 of the upper T-shaped plate 54 provides a place for mounting spools of plastic filament or wire (not shown) which sit on rods (not shown) which are mounted to the back or bottom 55 of the T of the upper T-shaped plate 54. From this position filaments 61 shown in FIG. 2 can be conveniently fed through openings 57 in the upper T-shaped plate.

Figure 4:
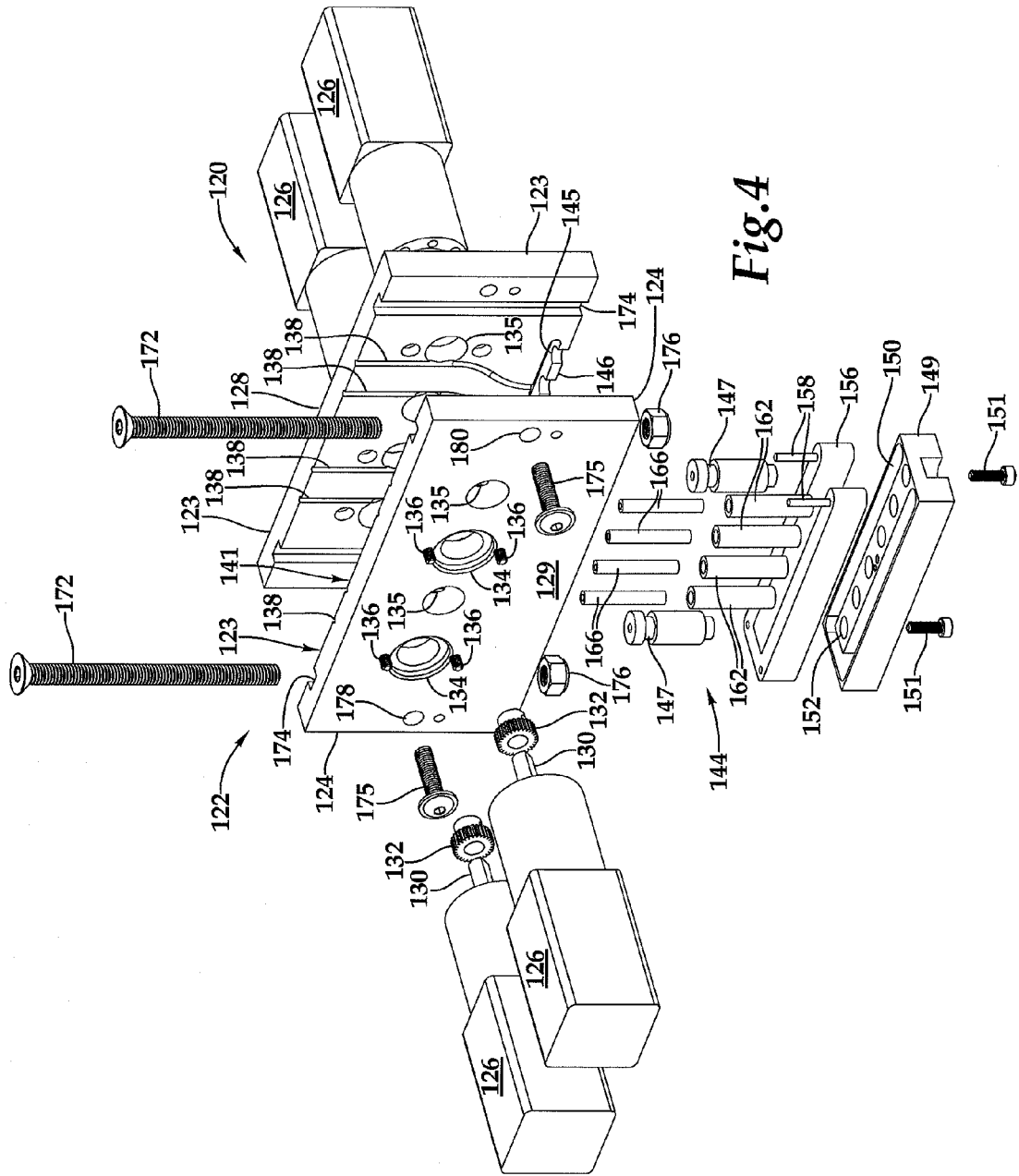
FIG. 4 is an exploded isometric view one of the printhead units of FIG. 2.

As shown in FIGS. 2 and 4, a fixed fused filament fabrication printhead unit 120 has a fixture 122 composed of two identical rectangular plates arranged in mirror image relation as a first motor mount plate 123 and second motor mount plate 124. Stepping motors 126 can be mounted in an evenly spaced linear array to the backs 128, 129 of the motor mount plates 123,124 as shown in FIG. 4. Two stepping motors 126 are mounted to the first motor mount plate 123 and two additional stepping motors 126 are mounted to the second motor mount plate 124. Each stepping motor 126 has a drive shaft 130 to which is mounted a drive gear 132. The drive shaft and the drive gear extend through one of a plurality of openings 134 formed in the motor mount plates 123, 124. The stepping motors 126 are mounted by screws 136 to the motor mount plates. The fixture 122 forms a plurality of filament guide paths 138 which are milled into the front face 140 of the motor mount plate 123 and into the opposed face 141 of the second motor mount plate 124. The opposed face 141 engages the front face 140 of the motor mount plate 123. The filament guide paths 138 are partially interrupted by the openings 135 through which the stepping motor drive gears 132 extend such that the filaments 61, best shown in FIG. 2, are driven along the guide paths by rotation of the drive gears. The guide paths 138 are arranged so the drive gears 132 engage the filaments 61 without significantly deforming the filaments but such that the drive gears pull the filaments in to the printhead units 120, 182 with considerable force, e.g., more than 5-10 pounds force, such that no additional parts such as additional bearing, spring, or adjustable pressure points on the opposing side of the filament are needed to feed the filaments. The guide paths are cylindrical results in 180 degrees of supporting surface which prevents a single pinch point, and the force on the filament is on the entire back side of the filament pressing it into a drive gear 132. Conventionally using flat supporting surfaces there is only 20-30 degrees of support. The drive gears 132 also drive the filaments 61 into an extrusion module 144. The guide paths 138 are arranged to converge towards the extrusion module 144 mounted to the lower edge 146 of the fixture 122 which is comprised of the lower edges of the motor mount plates 123, 124.

Figure 3:
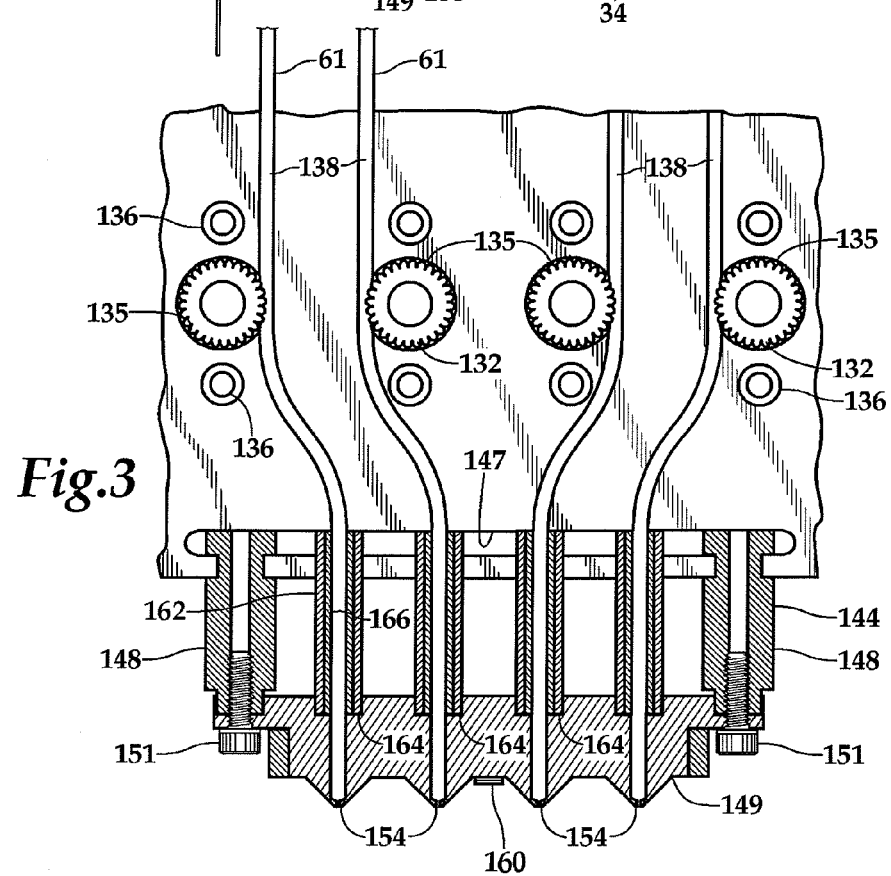
FIG. 3 is an enlarged fragmentary front elevational view of one of the printhead units of FIG. 2.

The extrusion module 144, best shown in FIG. 3, has insulating standoffs 148 constructed of a low thermal conductivity material i.e. less than about 5 W/(m·K) such as PEEK (polyetheretherketone) with a thermal conductivity around 0.25 W/(m·K).

Each of the motor mount plates 123, 124 has a milled opening 145 along the lower edge 146. The insulating standoffs 148 are clamped between the motor mount plates 123, 124, with one end engaged within the milled openings 145.

The insulating standoffs 148 have external circumferential grooves 147 which are captured by portions of the milled openings 146 as shown in FIG. 3. The insulating standoffs 148 support a thermally conductive i.e., greater than about 25 W/(m·K), heater bock 149 made of 6061 aluminum having a thermal conductivity of 154-180 W/(m·K). The insulating standoffs 148 support the heater block 149 by two screws 151. The heater block 149, as best shown in FIG. 4, has portions forming a groove 150 which surrounds a plurality of openings 152 leading to nozzle openings 154, shown in FIG. 2, which lead to the print tips 34. The filaments 61 are melted within the openings 152 by the heater block 149 which is heated by an electric ceramic heating element 156 as shown in FIG. 4. The heating element 156 may be a conductive ceramic or a wire such as an alloy of nickel, chromium and iron containing less than thirty percent iron sold under the trademark Nichrome®, which is placed in the U-shaped groove and ceramic is cast around the wire. The heating element 156 has two leads 158 through which a regulated current is applied. The regulated current is controlled based on the output of a thermal sensor 160, shown in FIG. 3, mounted to the heater block 149 so that the heater block is maintained at a constant temperature sufficient to liquefy the filaments 61. Alternatively, the ceramic heating element 156 can be used as the thermal sensor 160 by monitoring the resistance of the heating element which varies with temperature. The filaments 61 are driven by the gears 132 of the stepper motors 126 along the filament guide paths 138 and through rigid thermally insulating filament guides 162. The insulating filament guides 162 are clamped between the milled openings 145 shown in FIG. 4 and spot faces 164 around the openings 152. The insulating outer filament guides 162 are lined with nonstick high temperature inner filament guides 166 constructed of, for example, Polytetrafluoroethylene (PTFE), sold under the trademark Teflon®.

The printhead unit 120 is mounted to the upper T-shaped plate 54 in a milled groove (not shown) similar to the non-functional milled groove 168 shown for illustrative purposes in the base 42. Bolts 172 extend through support holes formed by the motor mount plate opposed grooves 174. The bolts 172 extend upwardly through support holes 170 in the upper T-shaped plate 54 and extend above the upper surface 59. The printhead unit support holes 170 are positioned on either side of the filament holes 57.

The motor mount plates 123, 124 are joined together by screws 175 passing through holes 178 so that the grooves 174 define support holes. The plates 123, 124 are supported on the bolts 172 by nuts 176 as shown in FIG. 4.

An alternative embodiment printhead unit 182 is shown in FIG. 2, where one half of the printhead unit 182 is shown. The printhead unit 182 is essentially identical to the printhead unit 120 shown in FIGS. 3 and 4, except that the first motor mount plate 184 incorporates two extrusion modules 144, and supports eight stepper motors 126 which drive eight filaments 61 along eight filament guide paths 138, supplying four filaments through each of the two extrusion modules 144. By doubling the number of print tips 34 the rate of material deposition can be approximately doubled depending on the scale of the object being printed.

Multiple printhead units 120 or 182 can be arranged on either side of the z-axis 28 to the full radius of the printer platform 24. Increasing the number of print tips 34 will proportionately increase the speed of printing a part layer, assuming the model 31 is of such size that all print tips can simultaneously print on portions of the model. Using more print tips 34 also reduces the necessary motion of the printer platform 24 along the y-axis 36. With a sufficient number and optimum arrangement of printheads the maximum movement of the cross slide 68 can be limited to only a maximum spacing between print tips 34 which is the spacing as shown in FIG. 2 between the adjacent print tips 186 and 188. Mounting of the printhead units 182 or 120 on either side of the z-axis 28 allows an entire print layer to be printed with only a rotation of 180° or π radians. Without any increase in the deposition rate of plastic or metal through the print tips 34, the angular velocity of the print platform, or the radial velocity of the print platform along the y-axis 36, the print speed can be increased proportionally by adding additional print tips 34.

Figure 5:
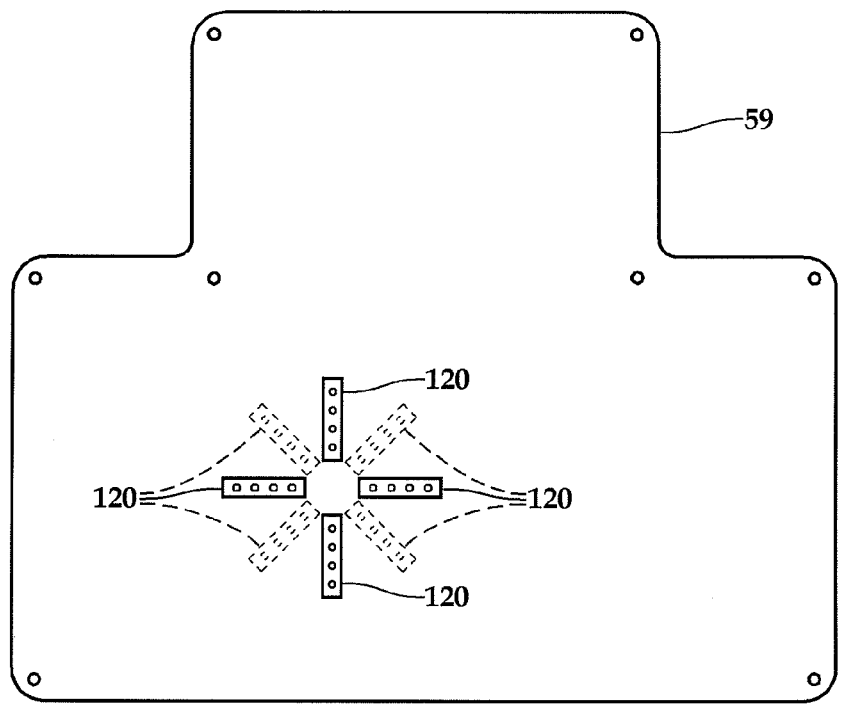
FIG. 5 is a bottom plan view of the top plate of the printer of FIG. 1.
Figure 6:
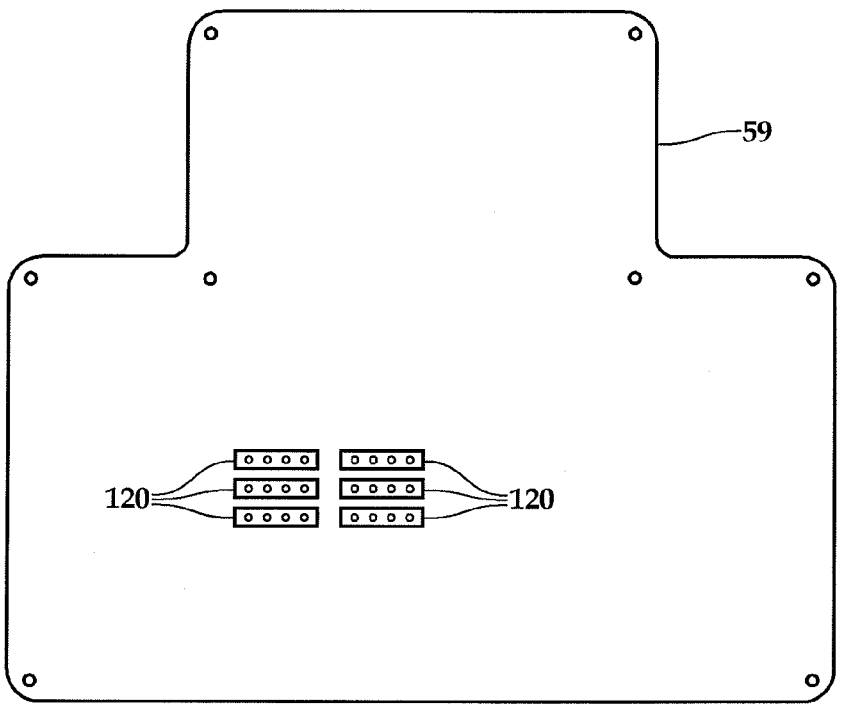
FIG. 6 is a bottom plan view of an alternative embodiment top plate of a printer of this invention.

Additional printhead units 182 or 120 with their additional print tips 34 can be arranged radially about a z-axis 28 as shown in FIG. 5, where four or eight lines of print tips 34 within print units 182 or 120 can, depending on geometry and size of the print object 31, double or quadruple the speed of deposition of a print layer. Additional printhead units 182 or 120 can also be arranged in a Cartesian grid as shown in FIG. 6. In both the Cartesian grid arrangement of FIG. 6 or the radial arrangement of FIG. 5, the print tips 34 of the additional printhead units 182 or 120 can be arranged to be at the same radial distance from the z-axis 28 when the printer platform is centered below the printhead units. Multiple print tips 34 at the same radius will reduce the angular rotation of the printer platform 22 between the radial direction movement steps along the y-axis 36 to print a complete layer. If the print tips 34 are arranged at different radial distances from the z-axis this will reduce the size of the of the total radial direction movement necessary to complete a print layer. The additional printhead units 182 or 120 are easily accommodated by simply milling additional grooves 168 on the underside of the top T-shaped plate 59. For maximum flexibility, both radial and Cartesian grooves can be superimposed so that the printhead units 182 or 120 can be rearranged between the radial and Cartesian arrangement.

The fused filament fabrication printer 20 printhead units 120 can be arranged such that the printheads completely span the radial width of the part 31 to be formed. For example in forming a 10 cm part with an array of printheads 26 with a spacing between printhead tips 34 of one centimeter, an array of six printheads extending from the center of the part 31 to the edge of the part allows printing a layer of the part with a one centimeter movement of the cross slide. Thus the printer 20 can employ an array of printheads over the entire radius of the print platform of, for example, 25 to 50 cm with 25 to 50 printheads. In setting up to print a particular part, filaments can be run to every printhead, or if the number of filaments 61 is limited for practical reasons, only every other or every third or fourth printhead can be supplied with the filament depending on the radius of the part 31 to be formed. In this way the total movement of the cross slide would be limited to 1, 2, 3, or 4 cm centimeters.

Control of the printing of a part layer involves determining the maximum extent of the print object 31 and using an optimization algorithm or a Monte Carlo simulation to determine the optimal radial start point and movement of the cross slide 68. Control of the print layer by the turning on and off of extrusion of plastic or metal under control of the stepper motors 126 employs a coordinate transform from the model coordinates to the instantaneous path of the print tips 34 and printing where the model indicates material is to be added.

If multiple print tips are available, different colored plastic filaments can be used to produce color models. To maximize print speed, all colors are used to fill solid parts of the model with a particular selected color for portions of the visible surfaces of the model. By printing with three or four colors RGB (red green blue) or CMYK (cyan, magenta, yellow and black) the possibility of creating a broad range of color hues is offered.

It should be understood that the fused filament can be a low melting point metal, for example solder with a melting point of 90 to 180-190° C. or even up to 450° C. If solder is employed, the heater block 149 may be made of stainless steel or other material compatible with liquid metal with a thermal conductivity of even less than 25 W/(m·K) and the insulating standoffs 148 may also be made of stainless steel or other material compatible with liquid metal. The standoffs 148, particularly in the case of a filament of solder, may be of a relatively high conductive material (i.e., greater than 5 W/(m·K)) like stainless steel where an insulating effect is created by the design geometry, for example using thin materials such as thin walled metal tubes for the filament guides 162. The inner filament guides 166 of polytetrafluoroethylene (PTFE) can still be used since PTFE may be used up to a maximum use temperature of 260° C./500° F.

In at least some circumstances the print head units 120, 180 can be simplified by fabricating the motor mount plate 123, 124, or 184, the standoffs 148, the filament guides 162, and the heater block 149 as one unitary part of the same material such as stainless steel or a similar material.

It should be understood that where a filament is described or claimed the filament may be any printing material in a form factor which can be used as a filament which function in the disclosed printhead. If the filament is plastic any functional material can be used e.g., ABS, HDPE, PLA, PVA or can be of made of a plastic filled with other material, for example nano particles (between 1 and 100 nanometers in size) of carbon or metal. Such filled plastic filaments could be sintered to form, for example, metal parts.

It should also be understood that the filaments 61 can be of a wide range of plastic materials such as acrylonitrile butadiene styrene (ABS), high-density polyethylene (HDPE), polylactic acid (PLA), and polyvinyl alcohol (PVA), waxes, and other thermoplastics.

It should be understood that a stepper motor is defined to include any motor with or without feedback which can be controlled to rotate in discrete steps.

It should be understood that where thermoconductivity of a material is described or claimed it is in reference to a temperature of between about 20° C. and 350° C.

It should be understood that the insulating standoff 148 can be constructed of low thermal conductivity materials, i.e. less than about 5 W/(m·K) such as certain stainless steel alloys, Hastelloy C, ceramics such as Steatite (soap stone) or fused silica could be used.

It should be understood that there can be more than one extrusion module mounted to the fixture in filament receiving relation to at least one of the filament guide paths such that several or only one filament is supplied to each of a plurality nozzle block, each block having a heating element, a thermal sensor, a heated guide path, and a filament guide connects a filament guide path to the heated guide path and from there to a portion of the nozzle block forming a print tip.

It should be understood that thermally conductive materials of greater than about 25 W/(m·K) can be used to form the heater bock 149 for example, aluminum, copper, silver or their alloys having thermal conductivity of 25, 50, 100, 200 or 350 or greater. It may be of particular advantage to have a greater conductivity when the filaments have a greater diameter.

It should be understood that the plurality of drive gears 132 used in the printhead units 120, 182 can be of different configuration or sizes, for example where the filaments used are of different materials, shapes or sizes.

It is understood that the invention is not limited to the particular construction and arrangement of parts herein illustrated and described, but embraces all such modified forms thereof as come within the scope of the following claims.

We claim:

1. A fused filament fabrication printhead unit comprising:
   a fixture;
   a plurality of stepper motors mounted to the fixture, each stepper motor of the plurality of stepper motors having a motor shaft and a filament drive gear mounted to the motor shaft;
   portions of the fixture forming a plurality of filament guide paths, each of the plurality of filament guide paths arranged to guide a filament through the fixture and into engagement with one of the filament drive gears, such that rotation of the filament drive gear drives the filament along one of the plurality of filament guide paths;
   an extrusion module mounted to the fixture in filament receiving relation to the filament guide paths, the extrusion module further comprising:
      at least one insulating standoff having a thermal conductivity of less than 5 W/(m·K) mounted to the fixture and supporting a nozzle block with a thermal conductivity greater than 25 W/(m·K);
      a heating element arranged in thermal contact with the nozzle block for heating the nozzle block;
      wherein portions of the nozzle block form a plurality of heated guide paths, each heated guide path leading to portions of the nozzle block forming a nozzle with a print tip;
      a plurality of thermally insulating filament guides having a thermal conductivity of less than 5 W/(m·K), each of the thermally insulating filament guides connecting one of the filament guide paths to one of the heated guide paths.

2. The printhead unit of claim 1 wherein the number of stepper motors and print tips is at least 3.

3. The printhead unit of claim 1 wherein the number of stepper motors and print tips is at least 4.

4. The printhead unit of claim 1 wherein the unit comprises at least two extrusion modules mounted to the fixture in filament receiving relation to the filament guide paths, wherein each of said at least two extrusion modules further comprises:
   at least one insulating standoff having a thermal conductivity of less than 5 W/(m·K) mounted to the fixture and supporting a nozzle block with a thermal conductivity greater than 25 W/(m·K);
   a heating element arranged in thermal contact with the nozzle block for heating the nozzle block;
   a thermal sensor in temperature monitoring relation to the nozzle block;
   wherein portions of the nozzle block form a plurality of heated guide paths each heated guide path leading to portions of the nozzle block forming a nozzle; and
   a plurality of thermally insulating filament guides having a thermal conductivity of less than 5 W/(m·K), each of the thermally insulating filament guides connecting one of the filament guide paths to one of the heated guide paths.

5. The printhead unit of claim 1 wherein the heating element forms a thermal sensor.

6. A fused filament printhead unit assembly comprising:
   a fixture;
   a plurality of plastic filaments;
   portions of the fixture forming a plurality of filament guide paths, each of the plurality of filament guide paths arranged to guide one of said plurality of plastic filaments through the fixture;
   a plurality of actuators mounted to the fixture, each actuator of the plurality of actuators arranged in driving relation to one of said plurality of plastic filaments;
   an extrusion module mounted to the fixture in filament receiving relation to the filament guide paths, the extrusion module further comprising:
      at least one insulating standoff having a thermal conductivity of less than 5 W/(m·K) mounted to the fixture and supporting a nozzle block with a thermal conductivity greater than 25 W/(m·K);
      a heating element arranged in thermal contact with the nozzle block for heating the nozzle block;
      a thermal sensor in temperature monitoring relation to the nozzle block;

wherein portions of the nozzle block form a plurality of heated guide paths, each heated guide path leading to portions of the nozzle block forming a nozzle having a print tip; and a plurality of thermally insulating filament guides having a thermal conductivity of less than 5 W/(m·K), each of the thermally insulating filament guides connecting one of the filament guide paths to one of the heated guide paths.

7. The fused filament printhead unit assembly of claim 6 wherein the plurality of actuators comprise stepper motors and wherein each stepper motor has a motor shaft and a filament drive gear mounted to the motor shaft in driving relation to one of said plurality of plastic filaments.

8. The fused filament printhead unit assembly of claim 6 wherein there are at least three actuators and at least three print tips.

9. The fused filament printhead unit assembly of claim 8 wherein there are at least four actuators and at least four print tips.

10. The fused filament printhead unit assembly of claim 6 wherein there are at least two extrusion modules mounted to the fixture in filament receiving relation to the filament guide paths, wherein each of said at least two extrusion modules further comprises:

at least one insulating standoff having a thermal conductivity of less than 5 W/(m·K) mounted to the fixture and supporting a nozzle block with a thermal conductivity greater than 25 W/(m·K);

a heating element arranged in thermal contact with the nozzle block for heating the nozzle block;

a thermal sensor in temperature monitoring relation to the nozzle block;

wherein portions of the nozzle block form a plurality of heated guide paths, each heated guide path leading to portions of the nozzle block forming a nozzle; and a plurality of thermally insulating filament guides having a thermal conductivity of less than 5 W/(m·K), each of the thermally insulating filament guides connecting one of the filament guide paths to one of the heated guide paths.

11. A fused filament fabrication printer comprising:
a frame;
a build platform mounted to the frame with at least three degrees of freedom;
wherein the build platform has a start-print surface;
at least one printhead unit fixedly mounted to the frame, the at least one printhead unit further comprising;
portions of the printhead unit forming a plurality of filament guide paths, each of the plurality of filament guide paths arranged to guide one of a plurality of filaments through the printhead unit;
a plurality of actuators mounted to the printhead unit, each actuator of the plurality of actuators arranged in driving relation to one of said plurality of filament guide paths to drive a filament along one of said plurality of filament guide paths;
an extrusion module forming part of the printhead unit in filament receiving relation to the filament guide paths, the extrusion module further comprising:
at least one insulating standoff having a thermal conductivity of less than 5 W/(m·K), the at least one insulating standoff positioned between the filament guide paths and at least one nozzle block with a thermal conductivity greater than 25 W/(m·K);
at least one heating element arranged in heat transfer contact with the nozzle block for heating the nozzle block;
wherein portions of the nozzle block form a plurality of heated guide paths, and a plurality of nozzles, and each nozzle forming one of a plurality of print tips, each heated guide path leading to portions of the nozzle block forming one of the plurality of nozzles; and a plurality of thermally insulating filament guides having a thermal conductivity of less than 5 W/(m·K), each of the thermally insulating filament guides connecting one of the filament guide paths to one of the heated guide paths.

12. The fused filament fabrication printer of claim 11 further comprising a thermal sensor in temperature monitoring relation to the nozzle block.

13. The fused filament fabrication printer of claim 11 wherein the plurality of print tips of the at least one printhead unit are on a line extending in a horizontal direction defined by motion of one of the three degrees of freedom.

14. The fused filament fabrication printer of claim 11 wherein the plurality of actuators comprises stepper motors and wherein each stepper motor has a motor shaft and a filament drive gear mounted to the motor shaft in driving relation to a filament in one of said plurality of filament guide paths.

15. The fused filament fabrication printer of claim 11 wherein there are at least three actuators and at least three print tips.

16. The fused filament fabrication printer of claim 11 wherein there are at least four actuators and at least four print tips.

17. The fused filament fabrication printer of claim 11 wherein there are at least two extrusion modules mounted to the fixture in filament receiving relation to the filament guide paths, wherein each of said at least two extrusion modules further comprises:

at least one insulating standoff having a thermal conductivity of less than 5 W/(m·K) mounted to the fixture and supporting a nozzle block with a thermal conductivity greater than 25 W/(m·K);

a heating element arranged in thermal contact with the nozzle block for heating the nozzle block;

a thermal sensor in temperature monitoring relation to the nozzle block;

wherein portions of the nozzle block form a plurality of heated guide paths, each heated guide path leading to portions of the nozzle block forming a nozzle with a print tip; and a plurality of thermally insulating filament guides having a thermal conductivity of less than 5 W/(m·K), each of the thermally insulating filament guides connecting one of the filament guide paths to one of the heated guide paths.

18. A fused filament printhead unit assembly comprising:
a fixture formed of two opposed motor mount plates joined together;
a plurality of filaments;
portions of each of the two opposed motor mount plates forming a plurality of filament guide paths, each of the plurality of filament guide paths arranged to guide one of said plurality of filaments through the fixture;
a plurality of stepper motors mounted to each of the motor mount plates, wherein each stepper motor has a motor shaft and a filament drive gear mounted to the motor shaft partly occluding one of the plurality of filament guide paths and in driving relation to one of said plurality of filaments;
at least one extrusion module mounted to the fixture in filament receiving relation to at least one of the filament guide paths, each extrusion module further comprising:
at least one standoff mounted to the fixture and supporting a nozzle block;
a heating element arranged in thermal contact with the nozzle block for heating the nozzle block;

a thermal sensor in temperature monitoring relation to the nozzle block;

wherein portions of the nozzle block form at least one heated guide path, each heated guide path leading to portions of the nozzle block forming a nozzle having a print tip; and a plurality of filament guides, wherein at least one filament guide connects one of the filament guide paths to the at least one heated guide path.

19. The fused filament printhead unit assembly of claim 18 wherein portions of the at least one nozzle block form a plurality of heated guide paths, each heated guide path leading to portions of the at least one nozzle block forming one of a plurality of nozzles, each nozzle forming a print tip; and a plurality of filament guides, each of the filament guides connecting one of the filament guide paths to one of the plurality of heated guide paths.

20. The fused filament printhead unit assembly of claim 18 wherein the plurality of filaments are wires of a metal with a melting point of between 90° C. to 450° C.

21. The fused filament printhead unit assembly of claim 18 wherein each motor mount plate is integrally formed with a portion of the extrusion module, a portion of the at least one standoff and a portion of nozzle block, so that when the motor mount plates are joined to form the fixture, the extrusion module, the at least one standoff and the nozzle block are also joined, and wherein the same metal forms the mount plates, the extrusion module, the at least one standoff and the nozzle block.

22. The printhead unit of claim 1 further comprising a thermal sensor in temperature monitoring relation to the nozzle block.

* * * * *